United States Patent [19]

Yano

[11] 3,729,583

[45] Apr. 24, 1973

[54] ROTARY HEAD TYPE MAGNETIC RECORDING AND REPRODUCING UNIT

[75] Inventor: Osahiko Yano, Kadoma, Japan

[73] Assignee: Matsushita Electric Industrial Co., Ltd., Kadoma-shi, Osaka, Japan

[22] Filed: Nov. 27, 1970

[21] Appl. No.: 92,967

[30] Foreign Application Priority Data

Dec. 4, 1969 Japan ....................45/97589

[52] U.S. Cl. ....................178/6.6 P, 178/6.6 A
[51] Int. Cl. ....................H04n 1/28, G11b 21/4
[58] Field of Search ....................178/6.6 A, 6.6 P

[56] References Cited

UNITED STATES PATENTS 3,017,462 1/1962 Clark et al....................178/6.6 P

*Primary Examiner*—J. Russell Goudeau
*Attorney*—Stevens, Davis, Miller & Mosher

[57] ABSTRACT

A rotary type magnetic recording and reproducing unit, in which high frequency fluctuating components in the speed of the rotary head are suppressed while maintaining a predetermined rotational phase of the rotary head with respect to the vertical synchronizing signal of the television signal to be recorded by preliminarily controlling the rotational phase of the rotary head such that a particular phase difference between the phase of a low frequency pulse series timed to a certain rotational phase of the rotary head and the phase of the vertical synchronizing signal in the television signal to be recorded is provided and subsequently controlling the rotational phase of the rotary head such that the phase of a high frequency pulse series timed to the afore-said certain rotational phase of the rotary head is brought into coincidence with the phase of the horizontal synchronizing signal in the television signal to be recorded.

3 Claims, 3 Drawing Figures

O. YANO
INVENTOR

BY Stevens, Davis, Miller & Mosher
ATTORNEY

ROTARY HEAD TYPE MAGNETIC RECORDING AND REPRODUCING UNIT

This invention relates to rotary head type magnetic recording and reproducing apparatus and, more particularly, to a rotary type magnetic recording and reproducing apparatus, in which stable rotation of the rotary head synchronized to the television signal to be recorded can be expected.

In the usual rotary head type VTR, the rotation of the rotary head is phase controlled in such a manner that the vertical synchronizing signal in the television signal to be recorded is positioned at the head switching point (track switching point). In addition to controlling the rotational phase of the rotary head with respect to the vertical synchronizing signal, however, it is also necessary to suppress high frequency speed fluctuations in one rotation of the rotary head in order to produce a master type for the recently announced magnetic tape contact transfer system or to record color television signals.

A principal object of the invention is to provide a means to suppress high frequency speed fluctuations of the rotational speed of the rotary head in the rotary head type magnetic recording and reproducing system.

Another object of the invention is to provide a control means suited to the rotational phase control of a rotary head disc presenting a large rotational inertia such as the one in the helical scan type VTR.

These and other objects together with the features and advantages of the invention will become clear from the following description of a preferred embodiment thereof, reference being had to the accompanying drawing, in which.

Figures 1, 2, 3:
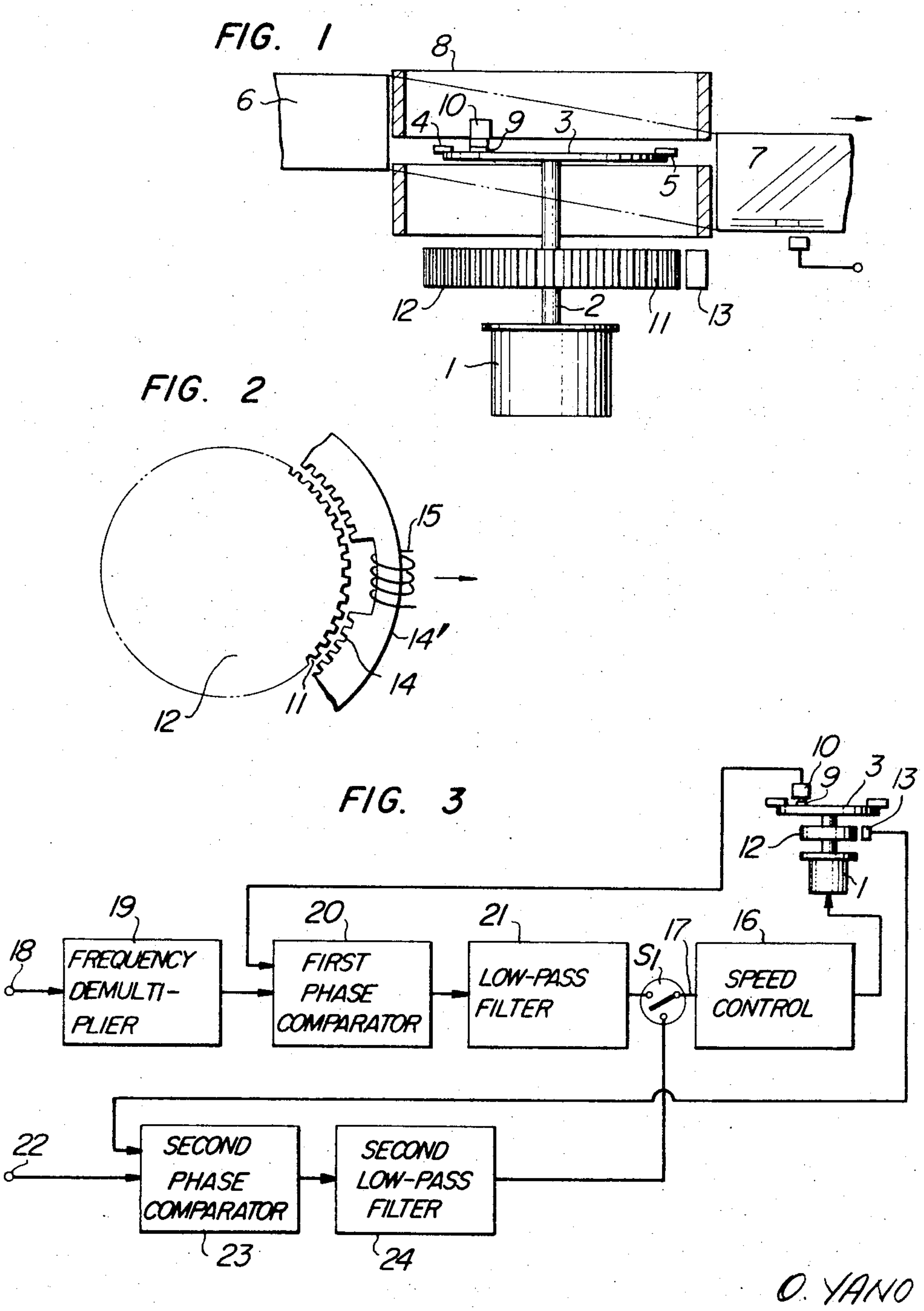
FIG. 1 is a schematic sectional representation of the main portion of a preferred embodiment of the invention.
FIG. 2 is a fragmentary plan view showing an arrangement of indented disc and indented magnetic core in the embodiment of FIG. 1.
FIG. 3 shows, mostly in block form, the entire arrangement of the control system according to the invention.

Referring now to FIG. 1, a rotary head drive motor 1 is shown having its shaft 2 provided with a rotary disc 3 secured thereto.

The rotary disc 3 is provided with magnetic heads 4 and 5 phased substantially 180° apart from each other.

A magnetic tape 6 is run slantwise with respect to the plane of revolution of the magnetic heads 4 and 5. It is moved about a tape guide 8 over an angular range of substantially 180° with respect to the head assembly. As the magnetic tape 6 proceeds, a video signal is recorded in or reproduced from successive magnetic tracks 7 on the tape 6, one field of the video signal in or out of one track.

The motor shaft 2 also carries a means to produce a pulse series, one pulse for each rotation of the shaft, for instance, a permanent magnet piece 9 secured to the rotary disc 3 and a detection head 10 having a pickup coil. Thus, if the magnetic heads complete 30 revolutions per second, the detection head 10 produces a pulse signal at 30 cps. A horizontal synchronizing pulse generating means may comprise an indented disc member 12 of a magnetic material secured to the motor shaft 2 underneath the disc 3 and formed with peripheral indentations 11 and a pulse detection means 13 facing the periphery of the indented disc member 12.

As shown in FIG. 2, the pulse detection means 13 may comprise an annular pickup core 14′ having inner indentations 14 at the same or 2 to 3 times the pitch of the indentation 11 of the disc member 12 and surrounding the disc member 12 such that the indentations 14 face the indentations 11. The pickup core 14′ is provided with a pickup coil 15.

By applying a DC voltage across the coil 15 to provide DC current therethrough, the rotation of the disc member 12 changes the reluctance of the magnetic circuit between the members 12 and 14′ in accordance with change in the position of the indentations 11 relative to the indentations 14 so as to vary the current through the coil 15.

The indentations 11 and 14 may be arranged such that 525 cycles of change of the reluctance are provided for each rotation of the disc member 12, so that with the disc member speed of 30 cps a current variation at a frequency of 15.75 kHz may be picked up as the horizontal synchronizing signal.

The servosystem for the rotary head motor is shown in FIG. 3. A DC motor is used as the rotary head motor 1. The DC motor 1 is controlled to a speed near 1,800 rpm by a speed control 16. The speed control 16 is of such construction that the speed control is effected by control voltage as indicated at 17. Thus, the following description is based upon the assumption that the motor speed is variable in accordance with the control voltage.

During recording, during which the video signal is recorded by the magnetic heads as successive tracks, one track for each field of the video signal, the head assembly is driven in synchronism with the vertical synchronizing signal at a speed of 30 rps. At this time, it is desirable from the standpoint of avoiding degradation of the reproduced picture quality to preset such that the vertical synchronizing pulse is positioned at a point near the discontinuous point of the track (the instant of switching the heads). To this end, the synchronously driven head assembly should be kept in a particular phase with respect to the vertical synchronizing signal.

A servo-loop to provide for keeping the synchronous drive in a particular phase with respect to the aforementioned 30-cps signal is formed by a first phase comparator 20, which compares the phase of each cycle of the 30-cps signal picked up by the pickup coil 10 with a one-half frequency-divided 30-cps signal from a frequency demultiplier 19 receiving vertical synchronizing signal separated from a television signal to be recorded, a low-pass filter 21 to filter the error signal of the phase comparator 20 so as to provide a DC voltage output, and a switch $S_1$ inserted between the low-pass filter 21 and the speed control 16.

Meanwhile, the horizontal synchronizing signal generator consisting of the indented disc member 12 and indented core 14′ provides its output signal at the frequency of 15.75 kHz through its pulse detection means 13 irrespective of the state of the switch $S_1$. The control sensitivity provided by the afore-mentioned servo-loop based on the vertical synchronization is still insufficient to cope with high frequency fluctuations in one rotation of the rotary head. A remarkably enhanced control sensitivity can be obtained through a second servo-loop constituted by a second phase comparator 23, which phase compares the 15.75-kHz signal from the pulse detection means 13 with the 15.75-kHz horizontal synchronizing signal separated from the video signal to be recorded and appearing at input terminal 22, a second low-pass filter 24 to smooth out the error signal from the second phase comparator 23. The second servo-loop is formed by throwing the switch pole of the switch $S_1$ to H contact. In this state, the speed control 16 receives the output of the second filter 24.

The provision of the second servo-loop thus makes it possible to absorb high frequency fluctuations in one rotation of the rotary head assembly, which cannot be suppressed by the conventional servo-loop based on the vertical synchronizing signal.

As is described, after controlling the vertical synchronizing signal in the television signal to be recorded with respect to predetermined points in the proximity of discontinuous points of the track through the first servo-loop, the first servo-loop is switched over to the second to control the rotation of the rotary head assembly as to absorb its high frequency fluctuations while keeping the head assembly rotation in correct phase with respect to the vertical synchronizing signal.

The control through the first servo-loop brings about the correct phase of the head assembly rotation several seconds after turning on the record switch. It will thus be convenient to arrange matters such that the switch $S_1$ is automatically thrown to the H terminal a predetermined time of several seconds after it is thrown to the V terminal.

The rotary head assembly high frequency jitter component is mainly due to fluctuations of the rotation of ball bearings for the motor shaft and torsional resonance between the motor shaft 2 and rotary disc 3. Sometimes, the jitter frequency is as high as several hundred cps.

In playback, 60-Hz and 15.75-kHz signals respectively corresponding in frequency to the vertical and horizontal synchronizing signals are provided from a separate synchronizing signal generator (not shown) to the respective reference synchronizing signal input terminals 18 and 22. Thus, during the playback the rotary head assembly is subjected to servo control based upon both vertical and horizontal synchronizing reference signals, so that it is driven with high precision.

With the conventional VTR for television broadcasting the rotation of the rotary head motor for playback is usually servo-controlled with a closed servo-loop, with which the synchronizing signal separated from the video signal reproduced by the rotary head is phase compared with a reference signal (for instance, at 60 cps) from a reference signal source. In this system, the speed of the rotary head during playback is controlled to equal the speed during recording at all times. This type of control is possible with the conventional system over the speed range of several hundred Hz to several kHz, because the moment of inertia of the rotary head disc in the broadcast VTR (four-head type) can be selected to be relatively small (compared to the two-head type). Thus, it may be said that the speed of the conventional broadcast VTR head shaft during playback is controlled to vary in consistence with the speed during the recording so as to absorb the jitter component of the reproduced signal ranging from 0 Hz to several kHz on the basis of the reproduced horizontal synchronizing signal.

In contrast, according to the invention the speed control during recording is effected through the horizontal synchronizing signal generator provided on the rotary shaft itself such that the rotary head is controlled absolutely, that is, it is rotated uniformly, as much as possible to produce an absolutely uniform recording, and during playback the rotary head is controlled also absolutely uniformly in lieu of timing the rotary head to the speed variations during recording with the same arrangement as for the recording. This mode of operation is particularly effective for application to the two-head VTR for industrial and precision use demanding high resolution. In the industrial two-head type VTR the rotational inertia of the rotary head disc is of the order of several $kg \cdot cm^2$ to several 10 $kg \cdot cm^2$, which is quite large compared to the broadcast four-head type (of the order of several hundred $g \cdot cm^2$). Accordingly, it is advantageous to make reverse use of the heavy rotational inertia, which is a weak point from the standpoint of the control responsibility, rather than controlling the rotary head in accordance with the high frequency jitter component. Because of the heavy rotational inertia, the rotation of the two-head type VTR rotary head disc is not appreciably affected by various fluctuating components of torque such as those due to external clutters that are exerted to the rotary shaft. This promotes the uniform speed control, and because of this the VTR rotary head speed is controlled uniformly both during recording and playback.

The tracking control of the record tracks 7 during playback may be made through the well-known capstan contact control system.

As has been described in the foregoing, according to the invention it is possible to suppress the high frequency jitter component in the reproduced video signal by controlling the head speed through a servo-loop based on the horizontal synchronizing signal both during recording and playback.

What is claimed is:

1. A rotary head type magnetic recording and reproducing unit, comprising:

two pulse generators respectively producing high frequency and low frequency pulse series in synchronism with a rotational phase of a rotary shaft of a rotary magnetic head assembly;

a first servo-control loop to control the rotational phase of said rotary shaft during recording so as to provide a predetermined phase difference with respect to the vertical synchronizing signal in a video signal to be recorded through the comparison of the phase of said low frequency pulse series with the vertical synchronizing signal;

a second servo-control loop to control the rotational phase of said rotary shaft during recording so as to provide predetermined phase differences with respect to the horizontal synchronizing signal in a video signal to be recorded through the comparison of the phase of said high frequency pulse series with the horizontal synchronizing signal; and a means to switch between said first and second servo-control loops.

2. A rotary head type magnetic recording and reproducing unit according to claim 1, wherein said means to switch between said first and second servo-control loops is so constructed as to automatically switch from said first over to said second servo-control loop a predetermined time after starting the recording.

3. A rotary head type magnetic recording and reproducing unit, comprising:

two pulse generators respectively producing high frequency and low frequency pulse series in synchronism with a rotational phase of a rotary shaft of a rotary magnetic assembly;

a first servo-control loop to control the rotational phase of said rotary shaft during recording so as to provide a predetermined phase difference with respect to the vertical synchronizing signal in a video signal to be recorded through the comparison of the phase of said low frequency pulse series with the vertical synchronizing signal;

a second servo-control loop to control the rotational phase of said rotary shaft during recording so as to provide predetermined phase differences with respect to the horizontal synchronizing signal in a video signal to be recorded through the comparison of the phase of said high frequency pulse series with the horizontal synchronizing signal;

a switching means to select either one of said first and second servo-control loops; wherein outputs from oscillators respectively at the frequencies of the vertical and horizontal synchronizing signals are used as the first and second reference signals during playback of a video signal.

* * * * *